United States Patent
Hosokawa

(10) Patent No.: US 8,538,238 B2
(45) Date of Patent: Sep. 17, 2013

(54) PLAYBACK APPARATUS USING A MEMORY FOR STORING A REPRESENTATIVE IMAGE

(75) Inventor: Shuichi Hosokawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 13/112,538

(22) Filed: May 20, 2011

(65) Prior Publication Data

US 2011/0305428 A1 Dec. 15, 2011

(30) Foreign Application Priority Data

Jun. 10, 2010 (JP) .................................. 2010-133350

(51) Int. Cl.
*H04N 9/80* (2006.01)
(52) U.S. Cl.
USPC ........................................... 386/241; 386/224
(58) Field of Classification Search
USPC ......................................... 386/241, 248, 239
See application file for complete search history.

(56) References Cited

U.S. PATENT DOCUMENTS

| 5,485,611 | A | * | 1/1996 | Astle ...................................... 1/1 |
| 6,043,847 | A | * | 3/2000 | Kadono et al. ............. 348/420.1 |
| 7,075,591 | B1 | * | 7/2006 | Jun et al. ....................... 348/700 |
| 8,019,195 | B2 | * | 9/2011 | Shiiyama ....................... 386/241 |
| 8,036,244 | B2 | * | 10/2011 | Naoe et al. ..................... 370/469 |
| 2001/0047517 | A1 | * | 11/2001 | Christopoulos et al. ........ 725/87 |
| 2004/0221227 | A1 | * | 11/2004 | Wu ................................. 715/512 |
| 2006/0008249 | A1 | * | 1/2006 | Nagasaka et al. ............... 386/68 |
| 2006/0045475 | A1 | * | 3/2006 | Watanabe et al. ............... 386/69 |
| 2011/0085059 | A1 | * | 4/2011 | Noh .......................... 348/231.99 |

FOREIGN PATENT DOCUMENTS

JP  2005-253087  9/2005

* cited by examiner

*Primary Examiner* — David Harvey
(74) *Attorney, Agent, or Firm* — Cowan, Liebowitz & Latman, P.C.

(57) ABSTRACT

Provided is a playback apparatus that has a function of generating a representative image of a moving image recorded in a recording medium. When moving image data of a plurality of clips is played back from the recording medium, a signal processor generates representative image data indicating representative images of clips based on the played-back moving image data, and stores the data in a memory. A display controller generates an index screen using the representative image data stored in the memory, and displays this on a display unit. Here, a controller determines a clip for which representative image data is to be stored in the memory based on the time necessary to generate representative image data, causes the signal processor to generate representative image data of the determined clip, and causes the memory to store that data.

13 Claims, 13 Drawing Sheets

FIG. 6

| | CLIP# | REPRESENTATIVE IMAGE DECODING NECESSARY TIME |
|---|---|---|
| BANK[0] | Clip#0 | 0 |
| BANK[1] | Clip#2 | 9009 |
| BANK[2] | Clip#1 | 0 |
| ... | ... | ... |
| BANK[m − 3] | Clip#N | 6006 |
| BANK[m − 2] | NULL | NULL |
| BANK[m − 1] | NULL | NULL |

FIG. 11A

| #088 B1 | #094 I2 | #100 I2 | #106 I2 | #112 I2 | #118 I2 |
| #089 I2 | #095 I2 | #101 I2 | #107 I2 | #113 I2 | #119 I2 |
| #090 I2 | #096 B0 | #102 I2 | #108 I2 | #114 I2 | #120 I2 |
| #091 I2 | #097 I2 | #103 I2 | #109 I2 | #115 I2 | #121 I2 |
| #092 P11 | #098 P11 | #104 I2 | #110 I2 | #116 I2 | #122 I2 |
| #093 I2 | #099 I2 | #105 I2 | #111 I2 | #117 I2 | #123 B1 |

| #088 B1 | #094 I2 | #100 I2 | #106 I2 | #112 I2 | #118 I2 |
| #089 I2 | #095 I2 | #101 I2 | #107 I2 | #113 I2 | #119 I2 |
| #090 I2 | #096 B0 | #102 I2 | #108 I2 | #114 I2 | #120 I2 |
| #091 I2 | #097 I2 | #103 I2 | #109 I2 | #115 I2 | #121 I2 |
| #092 P11 | #098 P11 | #104 I2 | #110 I2 | #116 I2 | #122 I2 |
| #093 I2 | #099 I2 | #105 I2 | #111 I2 | #117 I2 | #123 B1 |

| #088 B1 | #094 I2 | #100 I2 | #106 I2 | #112 I2 | #118 I2 |
| #089 I2 | #095 I2 | #101 I2 | #107 I2 | #113 I2 | #119 I2 |
| #090 I2 | #096 B0 | #102 I2 | #108 I2 | #114 I2 | #120 I2 |
| #091 I2 | #097 I2 | #103 I2 | #109 I2 | #115 I2 | #121 I2 |
| #092 P11 | #098 P11 | #104 I2 | #110 I2 | #116 I2 | #122 I2 |
| #093 I2 | #099 I2 | #105 I2 | #111 I2 | #117 I2 | #123 B1 |

1105, 1106

PLAYBACK APPARATUS USING A MEMORY FOR STORING A REPRESENTATIVE IMAGE

BACKGROUND OF THE INVENTION

1. Field of the Invention

The present invention relates to a playback apparatus, and in particular to an apparatus that generates a representative image of a moving image recorded in a recording medium.

2. Description of the Related Art

In recent years, recording playback apparatuses such as video cameras have appeared that capture moving images, record the captured images in a random access recording medium such as a flash memory card, and play back the images therefrom. Apparatuses of this type ordinarily have a configuration in which when recorded moving images are to be played back, representative images of respective scenes of the moving images recorded in the recording medium are generated and displayed, and a user selects a desired scene from among the representative images.

If a representative image is to be generated, moving image data recorded in the recording medium is played back and decoded, and one frame of the data is selected as a representative image, for example. Then, the size of the image data of the selected frame is reduced to a predetermined size suitable for display. The representative images of scenes obtained in this way are displayed in a list on the same screen as an index screen. Further, if the user instructs the switching of the index screen, processing for generating the above-described representative images is executed again, and the display screen is updated.

Thus, if a screen showing the list of representative images is to be displayed, it is necessary to sequentially play back and decode image data of scenes from the recording medium. Accordingly, there is a problem in that it takes time to display a screen showing the list of representative images (thumbnails).

In view of this, a configuration has been proposed in which representative image data that has been once displayed is stored in a memory in the apparatus, and if the same representative image is to be displayed again, the list screen is displayed without playing back moving image data from the recording medium (see Japanese Patent Laid-Open No. 2005-253087, for example).

However, the number of pieces of representative image data that can be stored in the memory in the apparatus is limited. Accordingly, in order to also display, in a list, representative images other than the representative images already stored in the memory, it is necessary to play back moving image data from the recording medium, after all. As a result, there has been the problem that it takes time to update a screen showing a list of representative images. Further, there is the problem that it further takes time if a picture (frame) in the middle of a moving image is designated as a representative image, rather than the first picture of one scene.

SUMMARY OF THE INVENTION

The present invention solves such problems. Further, the present invention provides an apparatus that can quickly obtain and display representative images of images recorded in a recording medium even in the case where a memory with a limited capacity is used.

According to one aspect of the present invention, a playback apparatus comprises a playback unit that plays back moving image data of a plurality of clips from a recording medium, a memory, a generation unit that, for each clip, generates representative image data indicating a representative image of the clip based on the moving image data played back by the playback unit, and stores the generated representative image data in the memory, an output unit that generates an index screen using representative image data stored in the memory, and outputs the index screen to a display device, and a control unit that determines, based on a time necessary for the generation unit to generate each representative image data, a clip for which representative image data is to be stored in the memory, and controls the generation unit such that representative image data of the determined clip is generated and the generated representative image data is stored in the memory.

Further features of the present invention will become apparent from the following description of exemplary embodiments with reference to the attached drawings.

BRIEF DESCRIPTION OF THE DRAWINGS

FIG. 6 is a diagram showing a management table.

FIGS. 11A to 11C are diagrams showing a state of accumulated representative image data.

DESCRIPTION OF THE EMBODIMENTS

Figure 1:
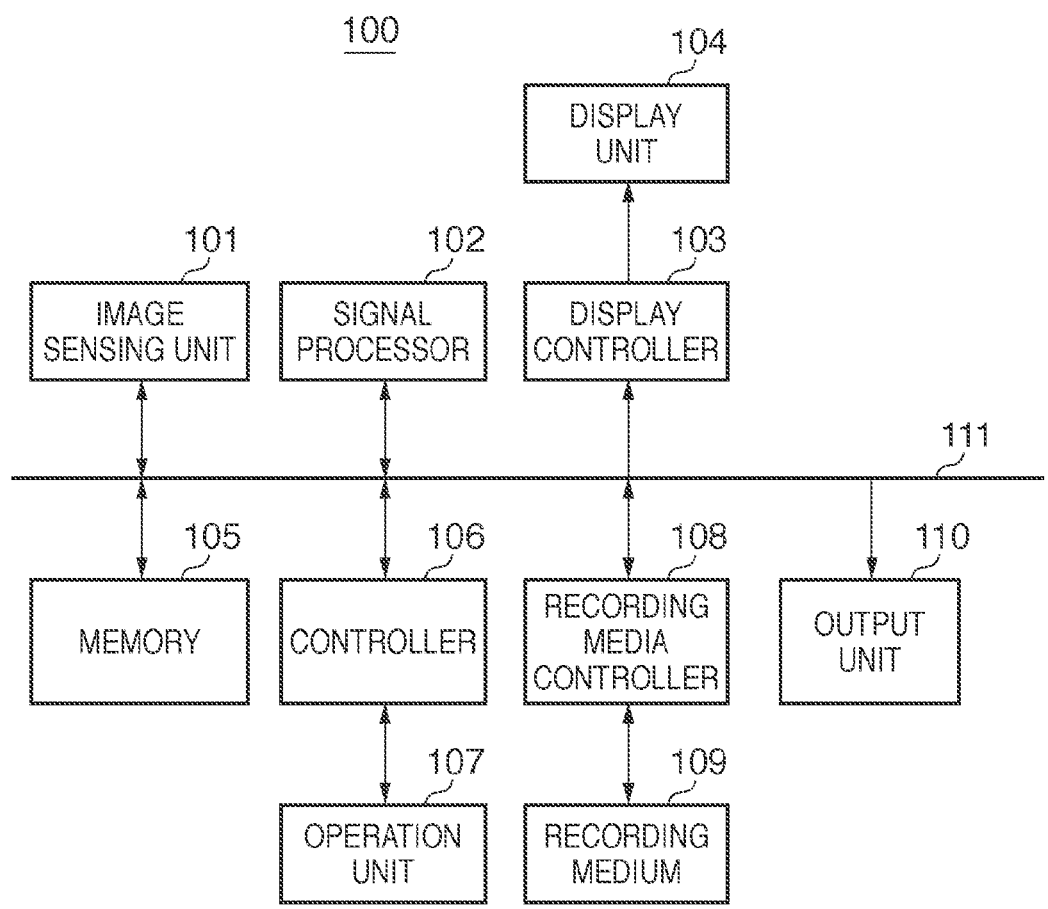
FIG. 1 is a diagram showing the configuration of a video camera according to an embodiment.

Below is a description of embodiments of the present invention. FIG. 1 is a diagram showing the configuration of a video camera 100 as an embodiment of a playback apparatus of the present invention. In FIG. 1, an image sensing unit 101 captures images of an object and outputs moving image data. A signal processor 102 performs determined processing on moving image data obtained by the image sensing unit 101 when recording is performed, and also encodes the data in accordance with an MPEG system. Further, the signal processor 102 decodes played-back moving image data when playback is performed. Further, the signal processor 102 generates representative image data based on the played-back moving image data as will be described later. A display controller 103 displays images according to moving image data obtained by the image sensing unit 101 on a display unit 104 when capturing is performed and displays images according to played-back moving image data when playback is performed. Further, the display controller 103 displays various information such as a menu screen on the display unit 104. Further, the display controller 103 generates a screen showing a list of representative images (index screen) as will be described later, and displays the generated screen on the display unit 104.

A memory 105 stores moving image data obtained by the image sensing unit 101, encoded moving image data, and representative image data. The memory 105 also stores information such as management information in a recording medium 109. A controller 106 has a microcomputer and controls the units of the video camera 100 in accordance with a program. An operation unit 107 is provided with a power switch, an instruction switch to start/stop capturing, a mode switch for switching between a capture mode and a playback mode, a switch for operating a menu screen, and the like. The controller 106 controls the units in response to instructions from the operation unit 107.

A recording media controller 108 records moving image data in the recording medium 109, and plays back moving image data from the recording medium 109. The recording medium 109 is a random access recording medium such as a flash memory card. The recording medium 109 can be easily replaced in the video camera 100 using an attachment/detachment mechanism (not shown). Further, the recording media controller 108 manages, as a file, various data to be recorded in the recording medium 109 in accordance with a known file system such as a FAT file system. An output unit 110 externally outputs moving image data obtained by the image sensing unit 101 and moving image data that is played back. A data bus 111 transmits and receives data and commands between the units.

First is a description of an operation when performing capturing. When the power is turned on by the operation unit 107, moving image data obtained by the image sensing unit 101 is output to the display controller 103 via the data bus 111. The display controller 103 displays a moving image according to the moving image data output from the image sensing unit 101 on the display unit 104.

If the operation unit 107 gives an instruction to start recording in such a recording pause condition, the moving image data output from the image sensing unit 101 is sent to and temporarily stored in the memory 105. The moving image data stored in the memory 105 is read in an order suitable for coding processing performed by the signal processor 102. The signal processor 102 encodes moving image data read from the memory 105 in accordance with, for example, an H.264/MPEG4-AVC system, and stores the encoded data again in the memory 105. The controller 106 stores various control information and the like in the memory 105, and generates stream data by multiplexing such information on the moving image data. Then, the recording media controller 108 reads data from the memory 105 according to a predetermined amount of stream data having been accumulated in the memory 105, and records the read data in the recording medium 109.

After this, the same processing is continued until an instruction to stop recording is received. Then, upon receipt of an instruction to stop recording, the recording of data in the recording medium 109 is stopped. In the present embodiment, the moving image data of a series of scenes recorded in the recording medium 109 from when an instruction to start recording is received until an instruction to stop recording is received is managed as one moving image file. A moving image in one scene is referred to as a clip. Further, the controller 106 generates a clip information file related to a moving image file indicating a recorded clip along with a stream data recording operation, and stores the generated file in the memory 105. Then, upon the end of recording one clip, the controller 106 causes the recording media controller 108 to read a clip information file from the memory 105, and record the read file in the recording medium 109. Further, the controller 106 generates management information indicating the positions of the recorded files and the like, and causes the recording media controller 108 to record the generated information in the recording medium 109.

Next is a description of data to be recorded in the present embodiment. In the present embodiment, an AV clip configured by a stream file (moving image file) and a clip information file, and a play list are recorded. A stream file and a clip information file are each recorded as an independent file. The same clip number is added to both the stream file and the clip information file as a file name. This clarifies that a stream file and a clip information file correspond to each other. Further, clip numbers that are mutually independent are added to stream files that are recorded. In the present embodiment, every time one AV clip is recorded in the recording medium 109, the clip number is incremented by one and added thereto.

In the present embodiment, moving image data is encoded in accordance with an H.264/MPEG4-AVC system. Moving image data is encoded by performing intra-frame coding and inter-frame predictive coding thereon. Specifically, in the case of H.264, moving image data is encoded selectively using three types of coding systems, namely, intra-frame coding, forward prediction inter-frame motion compensation predictive coding, and bidirectional prediction inter-frame motion compensation predictive coding. The encoded moving image data is configured by three types of pictures, namely, I pictures made only of I slices, B pictures made only of B slices, and P pictures made only of P slices. Further, moving image data is encoded on the basis of a GOP (group of pictures) made of one I picture frame and a predetermined number of P and B pictures. One stream data piece is generated by multiplexing PTSes (presentation time stamp) indicating the time at which each frame is to be decoded and displayed and various information on the encoded moving image data.

Figure 2:
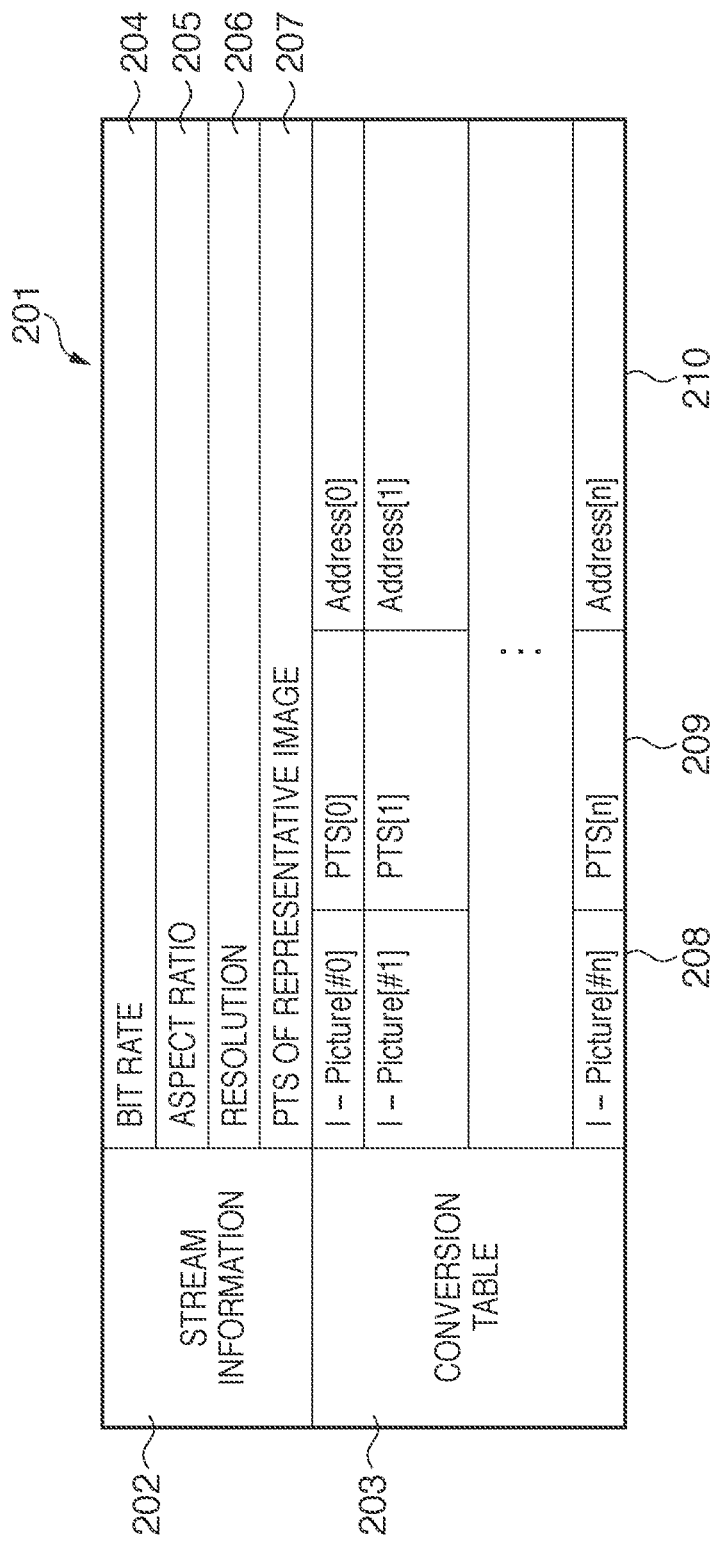
FIG. 2 is a diagram showing a clip information file.

FIG. 2 shows a clip information file. A clip information file 201 is configured by two types of information pieces, namely, stream information 202 and a conversion table 203. In the stream information, a bit rate 204 of corresponding stream data, an aspect ratio 205 thereof, a resolution 206 thereof, and a PTS 207 of the frame designated as a representative image thereof are stored. In the conversion table 203, a PTS 209 that indicates the display start time of all I pictures 208 in the stream data and an offset 210 that indicates the amount of data from the head of the stream data are associated and stored. By using this conversion table, the position of an I picture corresponding to a PTS designated in the stream data and the size from the head can be obtained.

A play list is recorded as a play list file. A play list file is configured by one or more items, and describes the items in the playback order. Each item is in one-to-one correspondence with an AV clip. Information for obtaining the file name of a designated AV clip, and information on AV clip playback start/end points are stored in each item. It is possible to play back AV clips in accordance with the desired order by designating and playing back items stored in the play list in the described order. Note that in the present embodiment, the controller 106 automatically generates and updates the play list file so as to play back AV clips in the recorded order.

Figure 3:
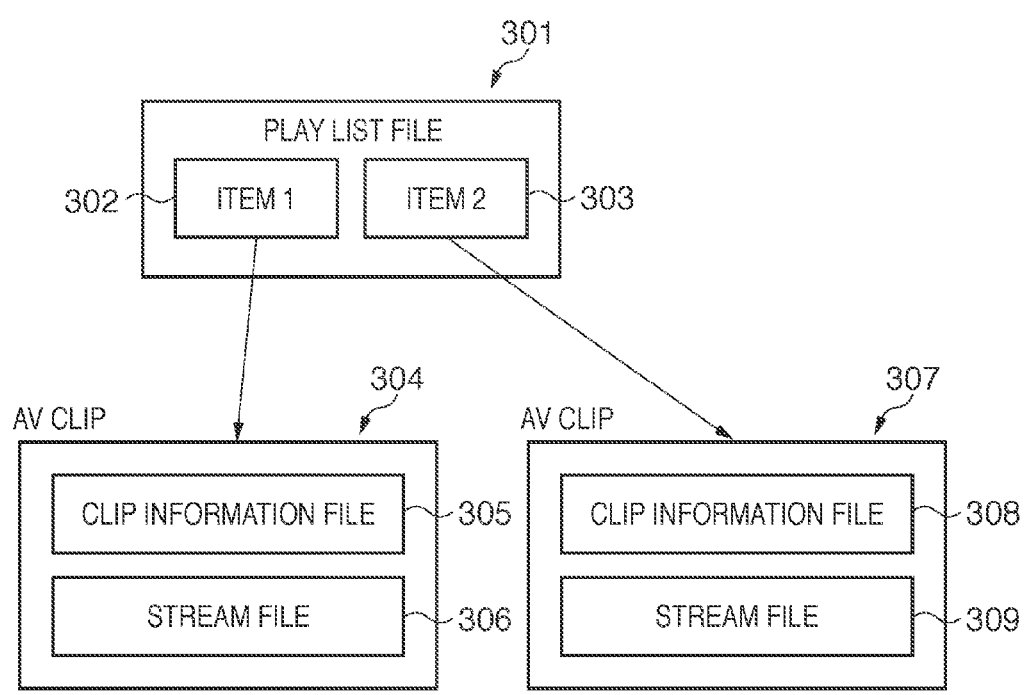
FIG. 3 is a diagram showing a play list and AV clips.

FIG. 3 is a diagram showing the correspondence between such a play list and AV clips. In FIG. 3, two AV clips 304 and 307 are recorded, and the order of play back of the AV clips is designated using a play list file 301. The AV clip 304 is configured by a stream file 306 and a clip information file 305, and the AV clip 307 is configured by a stream file 309 and a clip information file 308. In the AV clip 304, the stream file 306 and the clip information file 305 are recorded in association with each other. Further, in the AV clip 307, the stream file 309 and the clip information file 308 are recorded in association with each other.

The play list file 301 stores two items 302 and 303, the item 302 designating the AV clip 304, and the item 303 designating the AV clip 307. If the recording medium in FIG. 3 is to be played back, first, the AV clip 304 indicated by the item 302 is played back, and subsequently, the AV clip 307 indicated by the item 303 is played back.

Next is a description of the operation when performing playback. In the present embodiment, an index screen showing a list of representative images of clips (scenes) recorded in the recording medium 109 is displayed, and a desired scene is selected from among the representative images. The controller 106 displays an index screen on the display unit 104 as will be described later if the operation unit 107 gives a switching instruction to switch to the playback mode. A user selects a representative image of a desired clip from among the representative images displayed on the display unit 104, by operating the operation unit 107.

The controller 106 controls the recording media controller 108 based on management information recorded in the recording medium 109, and plays back, from the recording medium 109, the clip information file of the clip corresponding to the representative image selected by the user. Then, a stream file is played back based on the clip information file.

Stream data in the played-back stream file is once accumulated in the memory 105. Then, the signal processor 102 reads and decodes moving image data from the memory 105, and sends the decoded data to the memory 105. The output unit 110 converts the moving image data stored in the memory 105 into a format compatible with the display format of an external monitor or the like, and outputs the resultant data. Further, the display controller 103 displays a moving image according to the moving image data stored in the memory 105 on the display unit 104, instead of an index screen.

Next is a description of processing for generating and accumulating representative image data in the present embodiment. In the present embodiment, n screens (n is an integer of two or more, and six screens in this case, for example) worth of representative images are displayed in one index screen. Further, in the present embodiment, representative image data generated once is stored in the memory 105, and if a representative image of the same clip is to be displayed next, that representative image data is read from the memory 105. Accordingly, a representative image can be displayed without playing back moving image data from the recording medium 109. In the present embodiment, it is assumed that m screens (n<m, m screens=30 screens in this case, for example) worth of representative image data can be stored in the memory 105 at the maximum, and more than m representative image data pieces cannot be stored.

In the present embodiment, the controller 106 automatically designates the first screen of each moving image data as a representative image when recording a moving image. Accordingly, immediately after the recording, the PTS of the first frame of the clip is described in the PTS 207 of a representative image in the clip information file 201. Further, the user can change the representative image of each clip to another frame in the moving image data of the same clip after capturing a moving image.

For example, by operating the operation unit 107, the user selects a clip whose representative image is to be changed, and selects a frame to be designated as the representative image in the selected clip. Then, the controller 106 detects the PTS of the selected frame, and changes the PTS 207 of the representative image to the PTS of the designated frame. Note that, besides an I picture, it is also possible to designate a P or B picture as a representative image.

Figure 4:
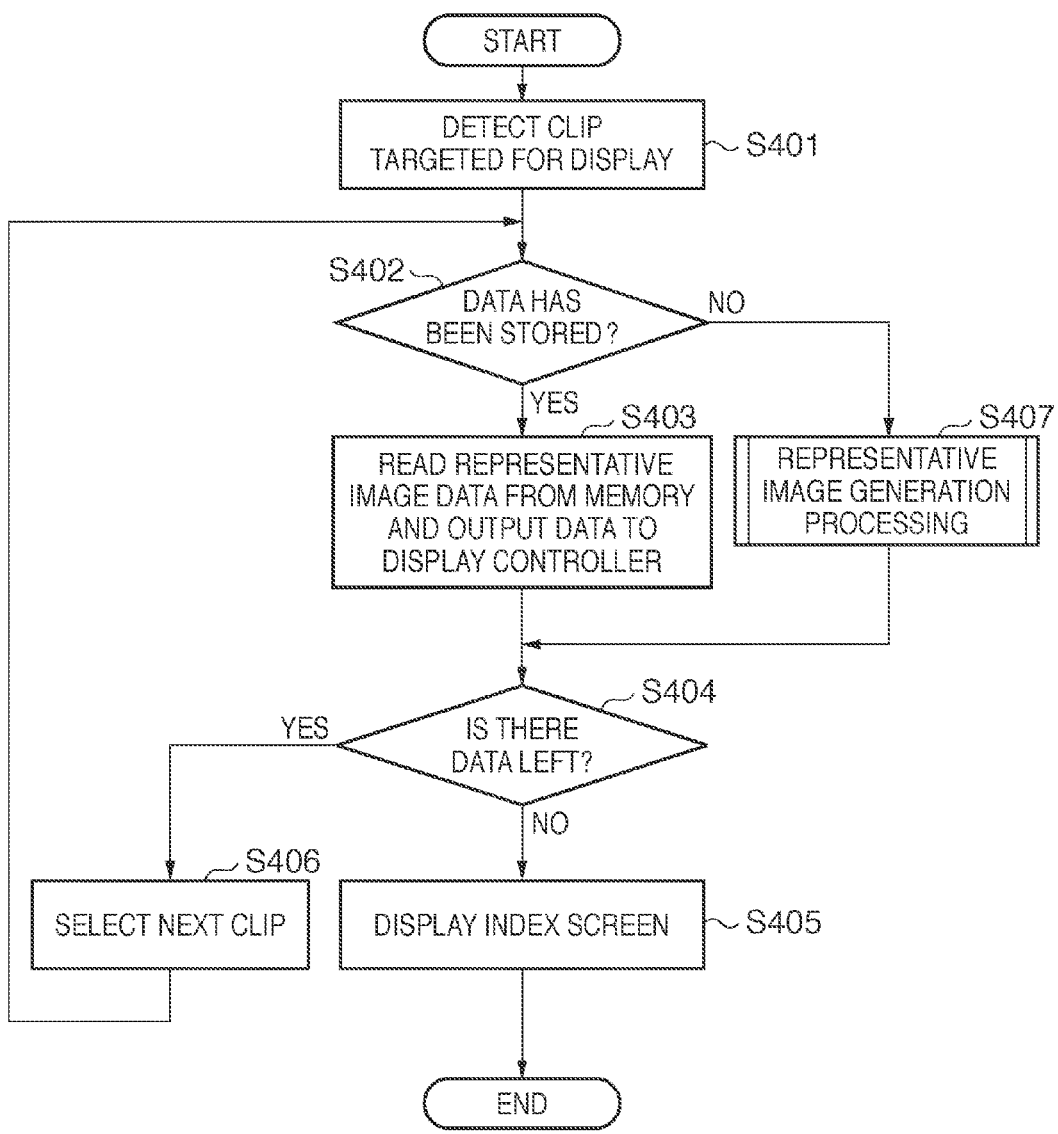
FIG. 4 is a flowchart showing processing for displaying an index screen.

FIG. 4 is a flowchart showing processing for displaying an index screen. Note that the processing in FIG. 4 is executed by the controller 106 controlling the units. If the user gives an instruction to switch to the playback mode or to stop playback, or a switching instruction to switch to a previous or subsequent index screen, the controller 106 detects the clip numbers of six screens worth of clips displayed in an index screen (S401).

For example, if an instruction to switch to the playback mode or to stop playback has been given, six clips starting from the clip number of the clip whose playback was stopped most recently are designated. In the present embodiment, the clip number of the clip that was being played back when playback of a moving image was stopped in response to an instruction to stop playback from the user is stored in management information, and recorded in the recording medium 109. Accordingly, the controller 106 detects the clip number of the clip played back most recently based on the management information. Then, six clips from the clip having this clip number are displayed in the index screen.

Further, if a switching instruction to switch to a previous index screen has been given, numbers obtained by subtracting n from each of the clip numbers of representative images that are currently displayed are designated. Further, if a switching instruction to switch to the next index screen has been given, numbers obtained by adding n to each of the clip numbers of representative images that are currently displayed are designated.

Next, the controller 106 judges based on a management table whether or not representative image data corresponding to the first clip number of the six detected clips is stored in the memory 105 (S402). The controller 106 generates a management table showing the clip number of each representative image data piece stored in the memory 105, and the time that was necessary to play back and decode moving image data from the recording medium 109 when generating this representative image data, and stores the generated table in the memory 105.

FIG. 6 shows an example of a management table. In the memory 105, m (30) screens worth of representative image data can be stored. In a management table 601, clip numbers 603 of representative images stored in storage regions (banks) 602 for respective representative image data are described. Moreover, necessary times 604 are described that indicate the time necessary to play back and decode moving image data from the recording medium 109 in order to generate representative image data of each clip. Note that the region where NULL is described in the clip number 603 in FIG. 6 indicates free space.

In S402, if representative image data corresponding to the designated clip number is stored in the memory 105, the controller 106 reads the representative image data from the memory 105, and sends the read data to the display controller 103 (S403). Further, if representative image data corresponding to the designated clip number is not stored in the memory 105, the controller 106 executes representative image generation processing, and outputs the generated representative image data to the display controller 103 (S407). Next, the controller 106 judges whether there still is a representative image that is to be displayed (S404), and if there is such a representative image left, the controller 106 selects the next clip number, and the processing returns to S402 (S406). Further, if representative image data of all clips has been output to the display controller 103, the display controller 103 is caused to generate an index screen, and display the generated screen on the display unit 104 (S405).

Figure 5:
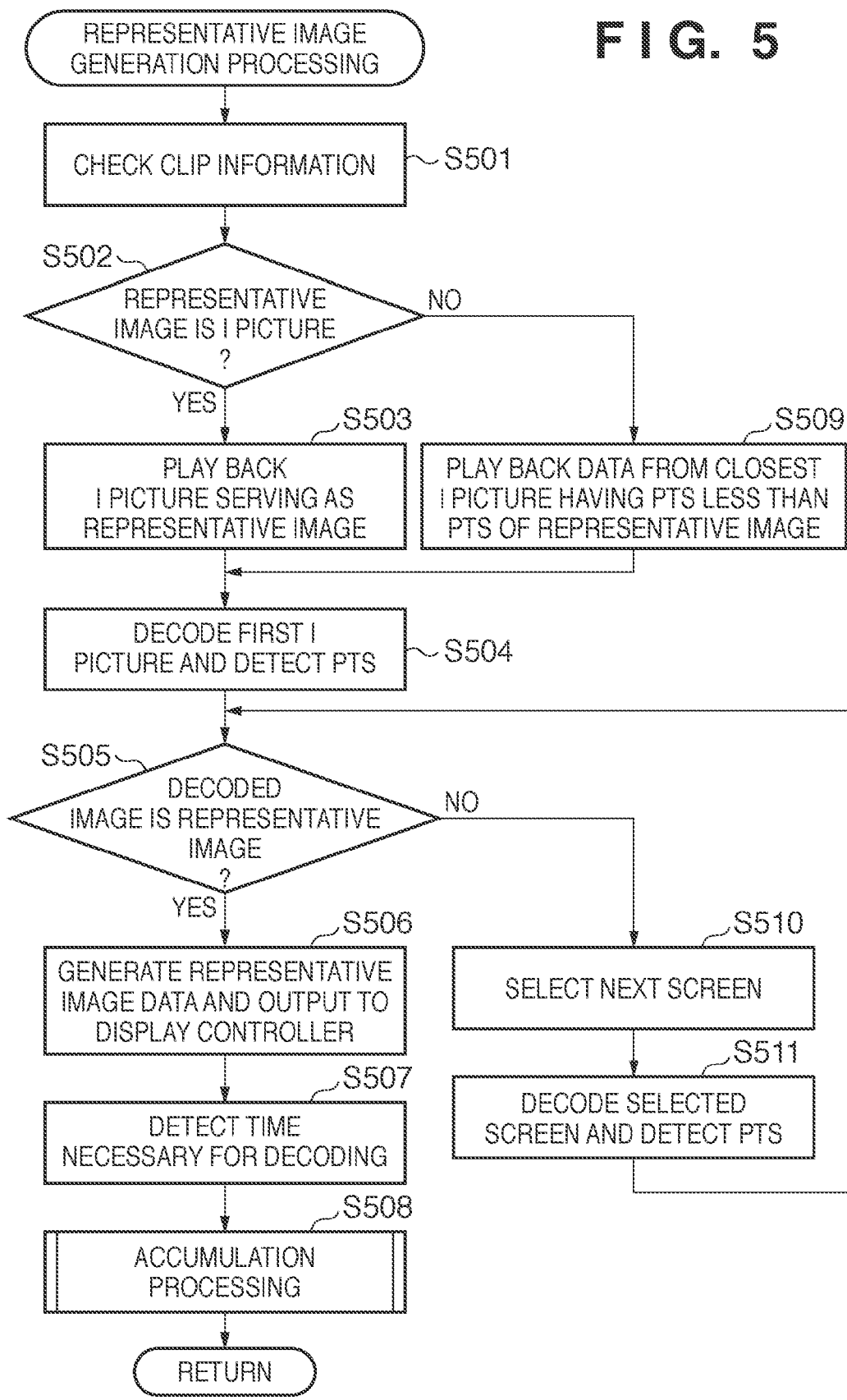
FIG. 5 is a flowchart showing processing for generating representative image data.

FIG. 5 is a flowchart of representative image generation processing in S407. First, the controller 106 causes the recording media controller 108 to read the clip information file having the designated clip number, from the recording medium 109 (S501). Then, it is judged based on the clip information file whether or not an I picture is designated as the representative image of the designated clip (S502). Specifically, it is judged whether or not the value described in the PTS 207 of the representative image matches the PTS 209 of any I picture in the conversion table 203.

If the representative image is an I picture, the offset 210 of the I picture designated as the representative image is detected based on the conversion table 203. Then, the recording media controller 108 is caused to play back, from the recording medium 109, one GOP worth of stream data starting from the designated I picture (S503). The played-back stream data is once stored in the memory 105. On the other hand, if the designated representative image is not an I picture in S502, the offset 210 of the closest I picture whose PTS 209 has a value less than that of the PTS of the representative image is detected based on the conversion table 203. Then, the recording media controller 108 is caused to play back two GOPs worth of stream data starting from the detected I picture from the recording medium 109 (S509). The played-back stream data is once stored in the memory 105.

Next, the first I picture of the stream data played back from the recording medium 109 is decoded, and the PTS thereof is detected (S504). Data of the decoded screen is stored in the memory 105 until accumulation processing in S508 ends. Then, the detected PTS is compared with the PTS 207 of the representative image, and it is judged whether or not the decoded frame is the representative image (S505). If the decoded frame is the representative image, the signal processor 102 is caused to reduce the screen size of the decoded data so as to generate representative image data, and output the generated data to the display controller 103 (S506). Then, a necessary time indicating the time necessary for playing back data of this frame from the recording medium 109 and decoding the data using the signal processor 102 is detected (S507). In the present embodiment, if the representative image is an I picture, the necessary time is set to 0. Further, if the representative image is not an I picture, the difference between the PTS of the first I picture of the GOP including the frame designated as the representative image and the PTS of the frame designated as the representative image is calculated, and sets the calculated difference as the necessary time. Then, accumulation processing is executed (S508), and the processing returns to the processing in FIG. 4.

On the other hand, if the decoded screen is not the representative image in S505, the next screen in the display order is selected (S510). Then, the PTS is detected by the signal processor 102 decoding the selected screen (S511), and the processing returns to S505. The data of the screen decoded here is once stored in the memory 105, and if it is judged that the decoded screen is not the representative image in S505, the stored data will be erased.

Figure 7:
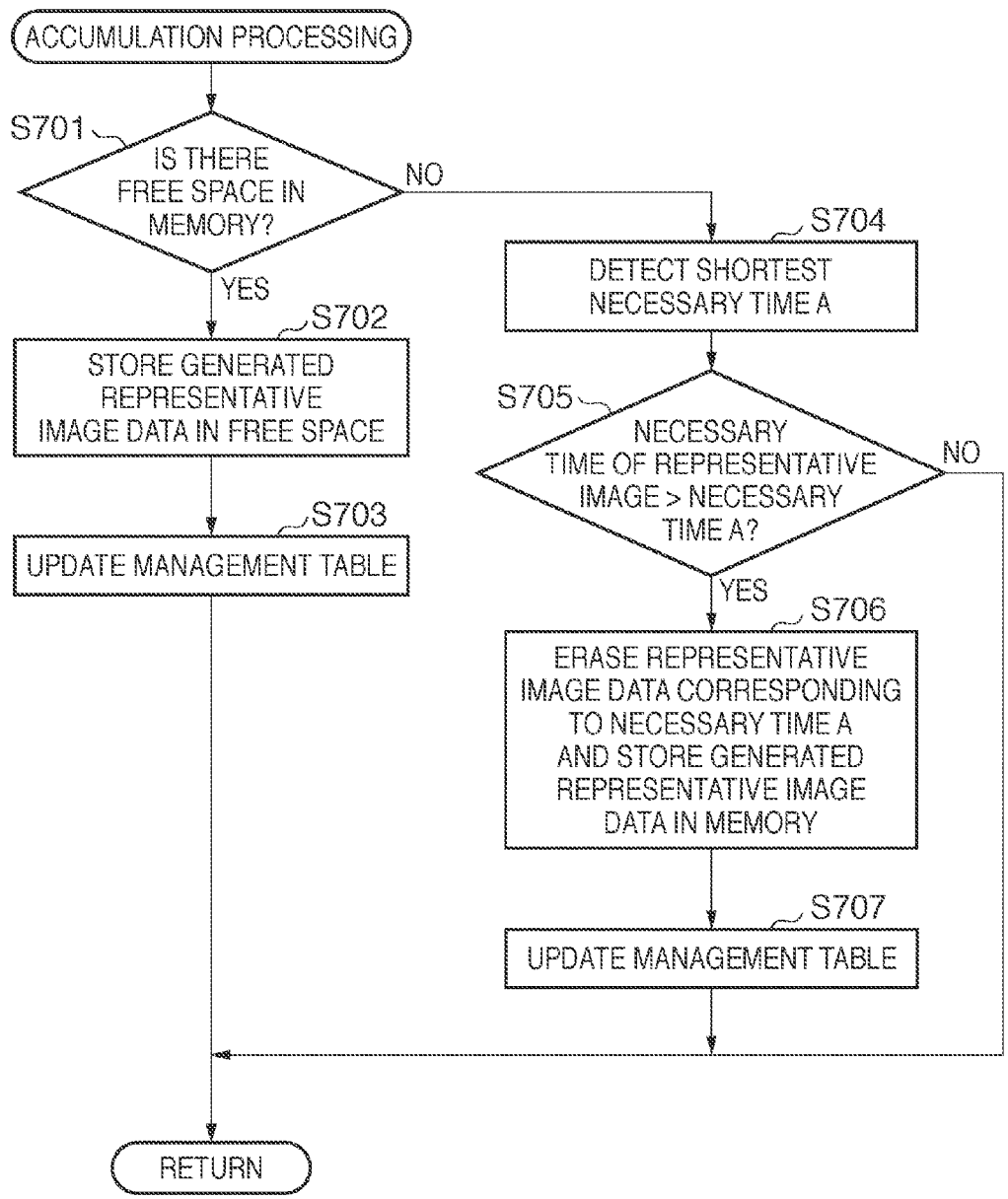
FIG. 7 is a flowchart showing processing for accumulating representative image data.

FIG. 7 is a flowchart showing accumulation processing in S508. First, the controller 106 judges whether or not there is free space in the storage region for representative image data by checking the management table shown in FIG. 6 (S701). Specifically, it is judged whether there is a region (bank) where NULL is described as the clip number 603 in the management table 601. As a result of this judgment, if there is free space, the generated representative image data is stored in the free space of the memory 105 (S702). Then, the clip number 603 and the necessary time 604 of the stored representative image data are described in the bank 602 having the smallest number among those of the free space in the management table 601, and the management table 601 is updated (S703).

On the other hand, if there is no free space in S701, the shortest necessary time A among the necessary times 604 stored in the memory 105 and the corresponding bank 602 are detected based on the management table 601 (S704). Note that if a plurality of banks corresponding to the shortest necessary time are found, any one of them is selected.

Next, it is judged whether or not the necessary time of the representative image generated this time is longer than the shortest necessary time A detected in S704 (S705). As a result of this judgment, if the necessary time of the representative image generated this time is shorter than or equal to the shortest necessary time A, processing ends without accumulating the representative image data generated this time in the memory 105. On the other hand, if the necessary time of the representative image generated this time is longer than the shortest necessary time A, the representative image data corresponding to the shortest necessary time A is erased from the memory 105, and the representative image data generated this time is instead stored in the memory 105 (S706). Then, the clip number 603 of the newly stored representative image data and the necessary time 604 are described in the bank 602 where the erased representative image data was stored, and the management table 601 is updated (S707). In this way, a clip for which representative image data is to be stored in the memory 105 is determined based on the time necessary to generate representative image data, and the representative image data of this determined clip is stored in the memory 105.

Figure 8:
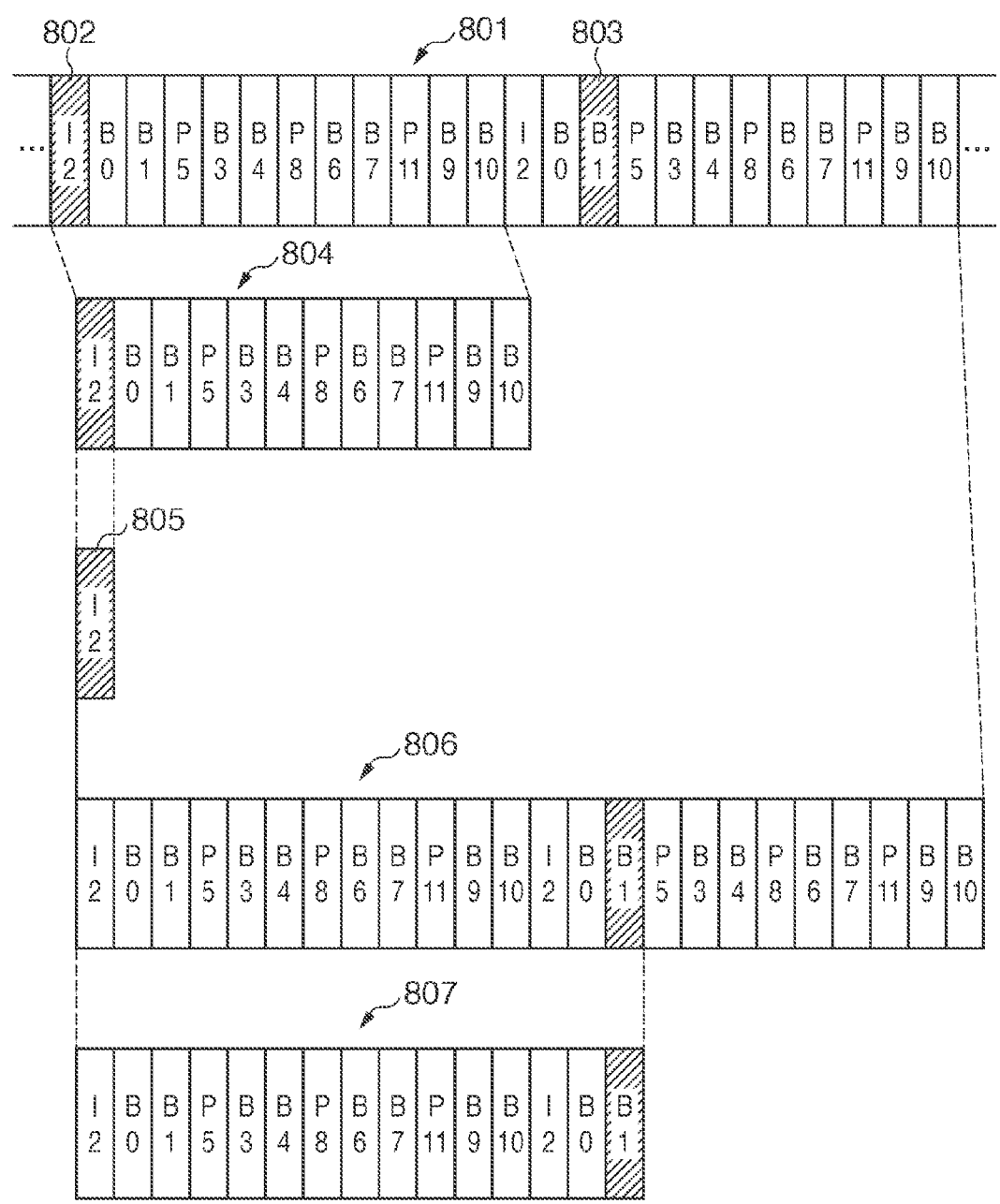
FIG. 8 is a diagram showing representative images in moving image data.

FIG. 8 is a diagram showing how representative image data is generated from moving image data recorded in the recording medium 109. A stream 801 indicates a part of stream data recorded in the recording medium 109. Although frames are encoded in the order indicated by the stream 801, the display order differs therefrom. In each GOP of the stream 801, the display order is B0, B1, I2, B3, and so on. For example, if an I2 picture 802 is designated as the representative image, a portion indicated by data 804 is read from the recording medium 109. As shown by 805, representative image data is generated at the point in time when the I2 picture is decoded. The necessary time at this time is 0.

Further, if a B1 picture 803 is designated as the representative image, two GOPs worth of data 806 starting from the closest I2 picture 802 whose PTS is less than the PTS of the B1 picture is read from the recording medium 109. Then, as shown by 807, representative image data is generated at the point in time when the B1 picture is decoded. The necessary time at this time corresponds to the difference between the PTS of the I2 picture 802 and the PTS of the B1 picture 803.

Thus, in the present embodiment, when representative image data is generated, and thereafter accumulated in the memory, in the case where there is no available space in the memory, data that requires a longer time to be generated is preferentially accumulated in the memory. Thus, it is possible to quickly display an index screen showing a list of representative images.

Note that although the difference between the PTS of the designated representative image and the PTS of the I picture immediately before the representative image is used as the necessary time for generating representative image data in the present embodiment, the necessary time for reading the stream from the recording medium 109 may be measured and added.

Next is a description of a second embodiment. In the second embodiment, the configuration of the video camera 100 and basic processing performed thereby are the same as those in the first embodiment. In the second embodiment, representative image data to be displayed in index screens previous and subsequent to the index screen currently displayed is also generated and stored in the memory 105.

Figure 9:
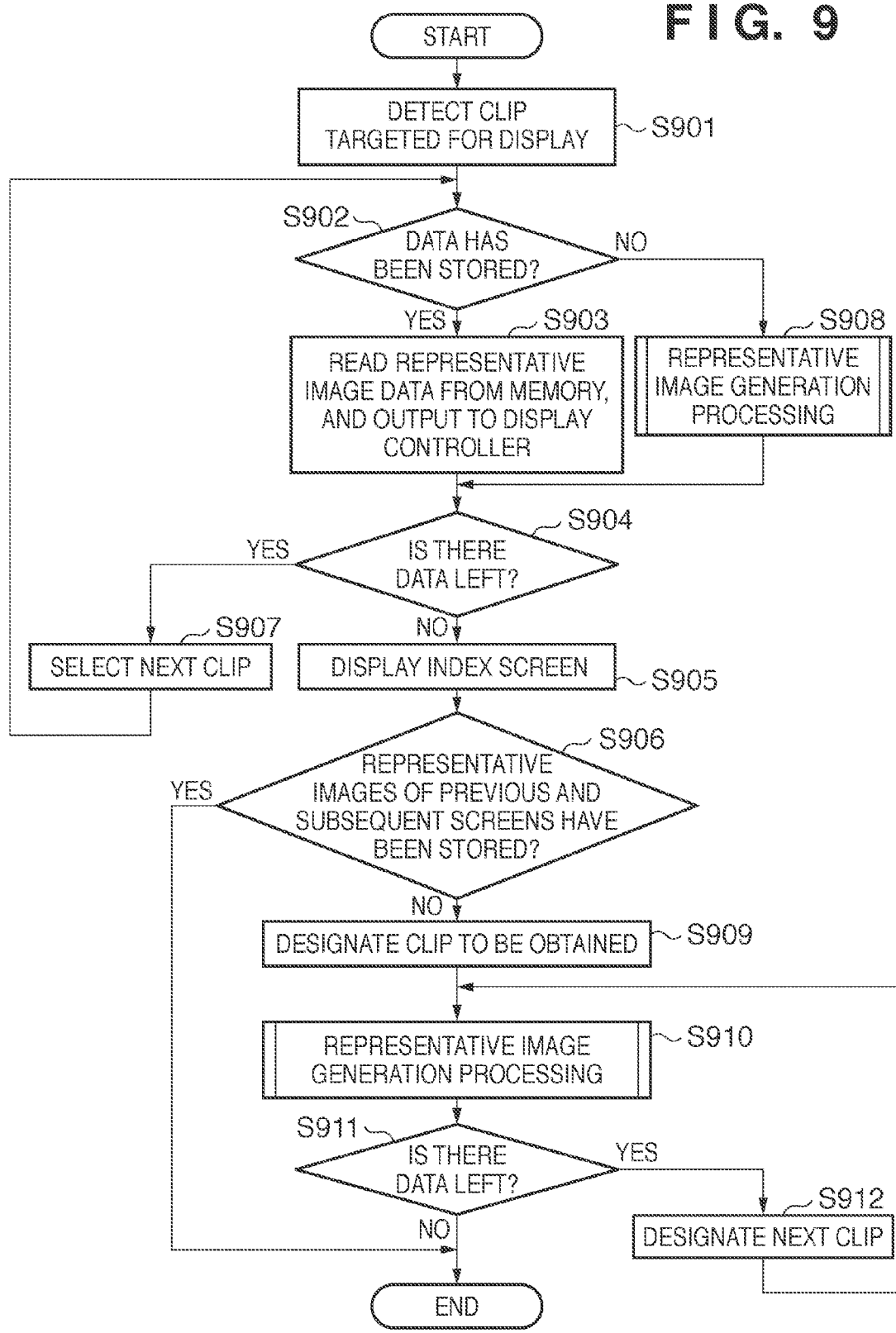
FIG. 9 is a flowchart showing processing for displaying an index screen according to a second embodiment.

FIG. 9 is a flowchart showing processing for displaying an index screen in the second embodiment. The processing in FIG. 9 is executed by the controller 106 controlling the units. If the user gives an instruction to switch to the playback mode or to stop playback, or a switching instruction to switch to a previous or subsequent index screen, the controller 106 detects the clip numbers of six screens worth of the clips to be displayed in an index screen (S901), as with the case of the first embodiment.

Next, the controller 106 judges based on the management table shown in FIG. 6 whether or not representative image data corresponding to the first clip number of the six detected clips is stored in the memory 105 (S902). If the representative image data corresponding to the designated clip number is stored in the memory 105, the controller 106 reads that representative image data from the memory 105, and sends the read data to the display controller 103 (S903). Further, if the representative image data corresponding to the designated clip number is not stored in the memory 105, representative image generation processing shown in FIG. 5 is executed, and the generated representative image data is output to the display controller 103 (S908).

Next, the controller 106 judges whether there still is a representative image that is to be displayed (S904), and if there is such an image left, the next clip number is selected, and the processing returns to S902 (S907). Further, if representative image data of all the clips has been output to the display controller 103, the controller 106 causes the display controller 103 to generate an index screen and display the generated screen on the display unit 104 (S905).

Next, it is judged whether or not all the representative image data to be displayed in the index screens previous and subsequent to the representative images targeted for display has been stored in the memory 105 (S906). In the present embodiment, representative images included in index screens to be displayed previous and subsequent to the index screen currently displayed are designated as the forced storage range. Then, when an instruction to display an index screen or an index screen switching instruction is given, representative image data in this forced storage range is obtained and stored in the memory 105. Specifically, it is judged whether all representative image data is stored that corresponds to the clip numbers from a number obtained by subtracting n from the smallest clip number of the representative images currently displayed to a number obtained by adding n to the largest clip number of the representative images currently displayed.

If all the representative image data to be displayed in the previous and subsequent index screens is not stored in the memory 105, the controller 106 designates a clip number to be obtained (S909), and executes representative image generation processing in FIG. 5 (S910). Then, it is judged whether or not there is representative image data that has not been stored in the memory 105 among representative image data to be displayed in the previous and subsequent index screens (S911), and processing ends if all such data has been stored in the memory 105. Further, if there is representative image data that has not been stored in the memory 105, a clip number that is to be obtained next is designated, and the processing returns to S910 (S912).

Figure 10:
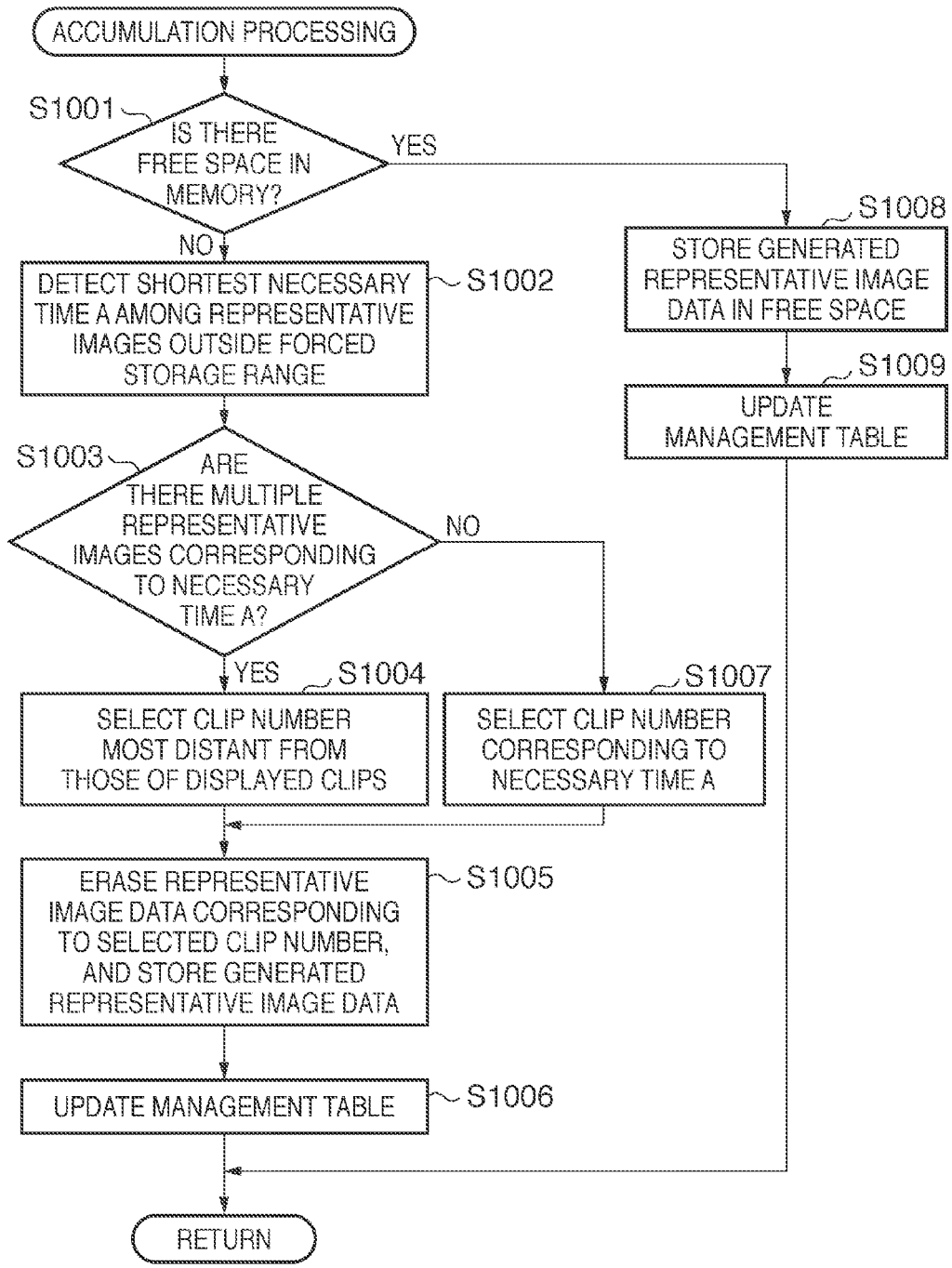
FIG. 10 is a flowchart showing processing for accumulating representative image data according to the second embodiment.

Although representative image generation processing in S908 and S910 is the same as the processing shown in FIG. 5, accumulation processing in S508 differs from the processing shown in FIG. 7 in the present embodiment. FIG. 10 is a flowchart showing accumulation processing in S508 in the second embodiment.

First, the controller 106 checks the management table shown in FIG. 6, and judges whether or not there is free space in the storage region for representative image data (S1001). If there is free space, generated representative image data is stored in the free space in the memory 105 (S1008). Then, the clip number 603 and the necessary time 604 of the stored representative image data are described in the bank 602 having the smallest number of those of the free space in the management table 601, and the management table 601 is updated (S1009).

On the other hand, if there is no free space in S1001, the necessary times 604 of representative image data other than that in the forced storage range are detected from among the representative image data stored in the memory 105, based on the management table 601. Then, the value A indicating the shortest necessary time among those of representative image data other than that in the forced storage range and the corresponding bank 602 are detected (S1002). Next, it is judged whether a plurality of banks corresponding to the shortest necessary time have been found (S1003), and if a plurality of such banks are found, the clip number that is most distant from the clip numbers of representative images currently displayed is selected (S1004). Further, if there is only one representative image corresponding to the shortest necessary time, that clip number of the representative image corresponding to the shortest necessary time is selected (S1007).

Next, representative image data corresponding to the selected clip number is erased from the memory 105, and the representative image data generated this time is instead stored in the memory (S1005). Then, the clip number 603 and the necessary time 604 of the newly stored representative image data are described in the bank 602 where the erased representative image data was stored, and the management table 601 is updated (S1006).

FIGS. 11A to 11C are diagrams showing representative image data stored in the memory 105 in the second embodiment. FIGS. 11A to 11C show the clip numbers of representative image data pieces, the coding types of frames designated as representative images in moving image data, and the positions thereof in the GOP.

Here, it is assumed that 30 representative image data pieces corresponding to clip numbers 088 to 117 shown in FIG. 11A are stored in the memory 105. In the present embodiment, since more than 30 representative image data pieces cannot be stored in the memory 105 as described above, representative image data pieces corresponding to clip numbers 118 to 123 are not stored in the memory 105. Here, it is also assumed that six screens having clip numbers 106 to 111 in a box 1101 are representative image data pieces included in the index screen currently displayed. Further, 18 screens having clip numbers 100 to 117 in a box 1102 including the box 1101 and six screens both previous and subsequent thereto are representative image data in the forced storage range.

If the index screen is switched from the state in FIG. 11A to the next screen, the six screens in a box 1103 in FIG. 11B are displayed as an index screen this time, being switched from the six screens in the box 1102. Following this, the forced storage range also moves from the box 1102 to a box 1104. Then, although six screens worth of representative image data corresponding to clip numbers 118 to 123 is newly generated and is to be stored in the memory 105, 30 representative image data pieces have already been stored in the memory 105, and thus available space is insufficient. Accordingly, among the representative image data corresponding to clip numbers 088 to 117 that has been already stored in the memory 105, representative data that can be obtained in a short time is detected from among representative image data other than that in the forced storage range 1104.

In FIG. 11B, the representative image data other than that in the forced storage range 1104 is the data corresponding to clip numbers 088 to 105. Since the data pieces corresponding to clip numbers 089 to 091, 093 to 095, 097, and 099 to 105 are all I pictures, the necessary time is the same. Thus, among such representative image data, the six screens that are most distant from those in the index screen currently displayed are deleted. In FIG. 11B, six screens worth of representative image data pieces corresponding to clip numbers 089 to 091 and 093 to 095 are deleted from the memory 105. After that, newly generated representative image data pieces corresponding to clip numbers 118 to 123 are stored in the memory 105.

If the index screen is switched to a previous index screen from the state in FIG. 11B, the state will then become the state in FIG. 11C, and the six screens in a box 1105 are displayed as an index screen. Following this, although data in a box 1106 becomes representative image data in the forced storage range, all the representative image data in the box 1106 has already been stored in the memory 105, and thus representative image data is not newly generated.

If an index screen switching instruction to switch to a previous index screen is furthermore given twice in succession in the state of FIG. 11C, clip numbers 094 to 099 will be the clip numbers of data targeted for display. However, representative image data corresponding to clip numbers 096 to 099 has already been stored, and thus it is sufficient for representative image data corresponding to clip numbers 094 and 095 to be generated and displayed. Since representative image data pieces corresponding to clip numbers 094 and 095 are both I pictures, it is possible to quickly generate representative image data.

Thus, in the present embodiment, representative image data that is to be displayed in a predetermined range of index screens previous and subsequent to the index screen currently displayed is set as the forced storage range and stored in the memory 105. Then, if representative image data is newly generated, data with a short necessary time for being obtained among representative image data other than that in the forced storage range 1104 is deleted from the memory 105, and newly generated representative image data in the forced storage range is stored in the memory 105. Accordingly, it is possible to quickly display a next index screen when an index screen switching instruction has been given.

Next is a description of a third embodiment. In the third embodiment, the configuration of the video camera 100 and basic processing performed thereby are the same as those in the first and second embodiments. In the third embodiment, as with the case of the second embodiment, representative image data to be displayed in index screens previous and subsequent to the index screen currently displayed is generated and stored in the memory 105. In the present embodiment, the following processing will be performed if there is no free space in the memory when representative image data is newly generated. Specifically, in this case, even representative image data with a long necessary time among representative image data outside the forced storage range will be deleted, if the data has a clip number distant from the clip numbers of representative images currently displayed by more than L (L is a predetermined integer larger than m−n).

Figure 12:
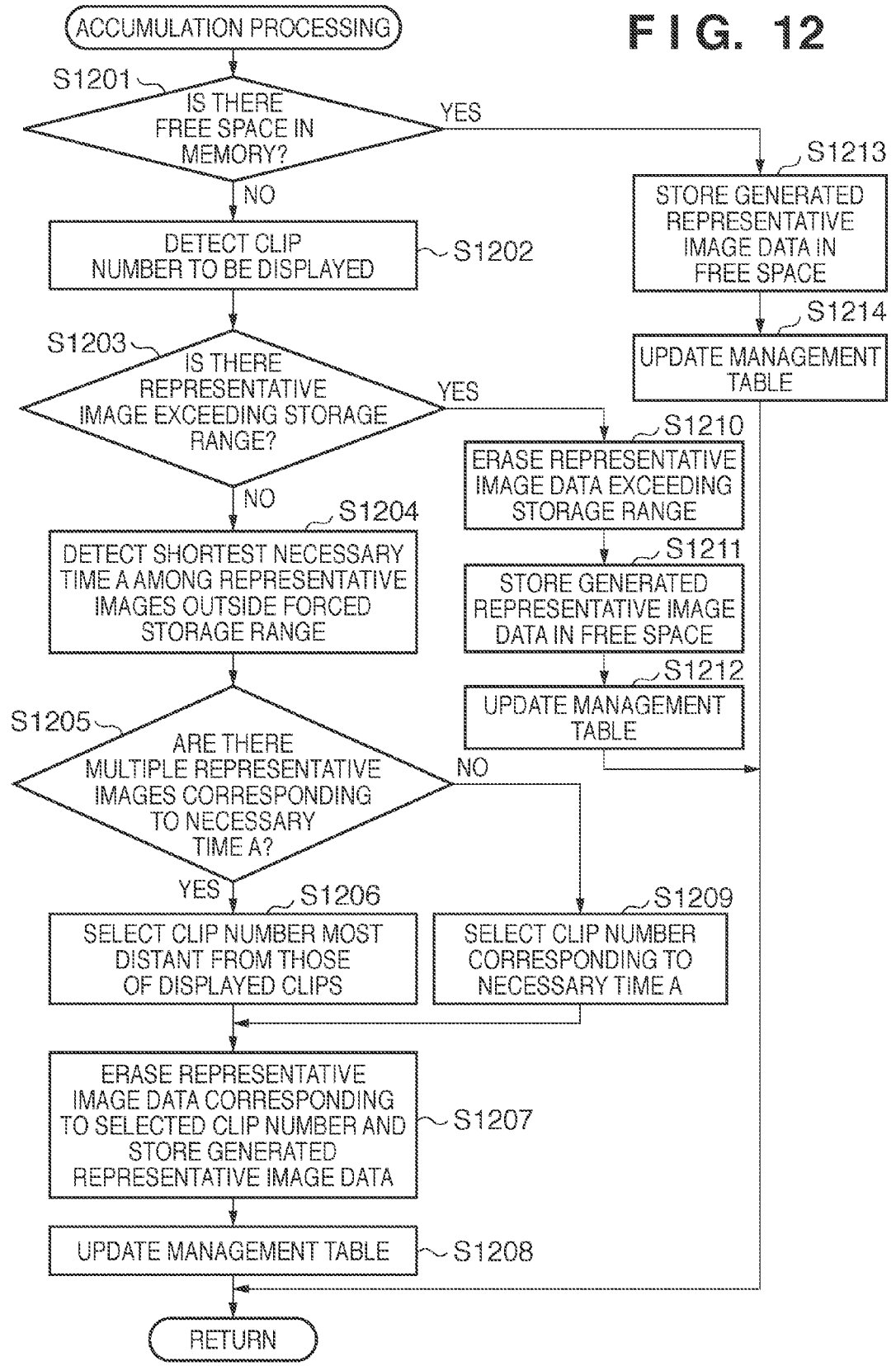
FIG. 12 is a flowchart showing processing for accumulating representative image data according to a third embodiment.

Since accumulation processing in S508 shown in FIG. 5 differs from that in the second embodiment, the third embodiment describes the accumulation processing. FIG. 12 is a flowchart showing accumulation processing according to the third embodiment. First, the controller 106 checks the management table shown in FIG. 6, and judges whether or not there is free space in the storage region for representative image data (S1201). As a result, if there is free space, generated representative image data is stored in the free space in the memory 105 (S1213). Then, the clip number 603 and the necessary time 604 of the stored representative image data are described in the bank 602 having the smallest number among those of the free space in the management table 601, and the management table 601 is updated (S1214).

On the other hand, if there is no free space in S1201, the clip numbers included in the index screen that is being displayed are detected (S1202). Then, it is judged whether or not representative image data corresponding to clip numbers that exceed the range of the predetermined value L previous and subsequent to the clip numbers of data targeted for display are stored in the memory 105 (S1203). For example, if L is assumed to be 24, in the case where the clip numbers of data targeted for display are 100 to 105, it is judged whether or not representative image data corresponding to clip numbers 75 or less and 130 or more is stored.

If representative image data corresponding to a clip number exceeding the range L is stored, such representative image data corresponding to a clip number exceeding this range L is erased from the memory 105 (S1210). At this time, if a plurality of representative image data pieces corresponding to a clip number exceeding the range L are stored, data with the shortest necessary time or data corresponding to the most distant clip number among such representative image data may be erased or all of such representative image data may be erased. Then, the generated representative image data is stored in the memory 105 (S1211). Next, the clip number 603 and the necessary time 604 of the newly stored representative image data are described in the bank 602 where the erased representative image data was stored, and the management table 601 is updated (S1212).

In S1203, if it is judged that representative image data corresponding to a clip number exceeding the range L is not stored, the smallest (shortest) value A among the necessary times 604 stored in the memory 105 and the corresponding bank 602 are detected (S1204).

Next, it is judged whether or not a plurality of pieces of representative image data corresponding to the necessary time A have been detected (S1205). As a result of this judgment, if a plurality of representative images corresponding to the necessary time A are stored, representative image data corresponding to a clip number that is most distant from the clip numbers of representative images serving as display candidates is selected from among the plurality of representative images (S1206). Then, the selected representative image data is erased from the memory 105, and the representative image data generated this time is instead stored in the memory (S1207). Then, the clip number 603 and the necessary time 604 of the newly stored representative image data are described in the bank 602 where the erased representative image data was stored, and the management table 601 is updated (S1208).

On the other hand, if there is only one representative image data piece corresponding to the necessary time A in S1205, the representative image data corresponding to the clip number that corresponds to the necessary time A is selected (S1209). Then, the selected representative image data is erased from the memory 105, and the representative image data generated this time is instead stored in the memory (S1207). Then, the clip number 603 and the necessary time 604 of the newly stored representative image data are described in the bank 602 where the erased representative image data was stored, and the management table 601 is updated (S1208).

Figure 13A:
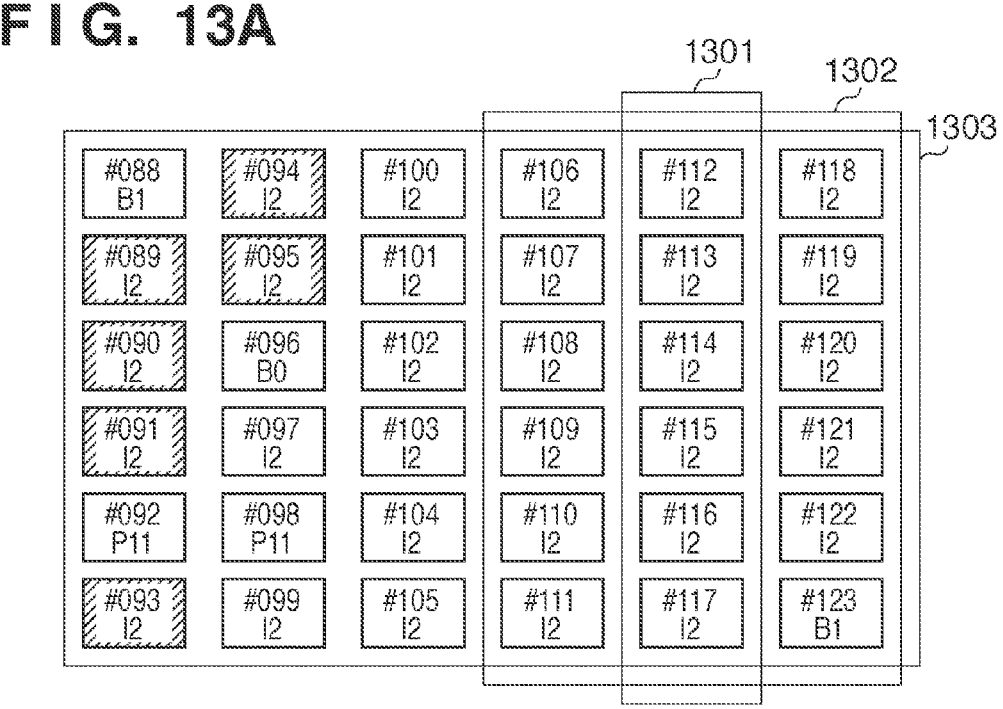
FIGS. 13A and 13B are diagrams showing a state of accumulated representative image data.
Figure 13B:
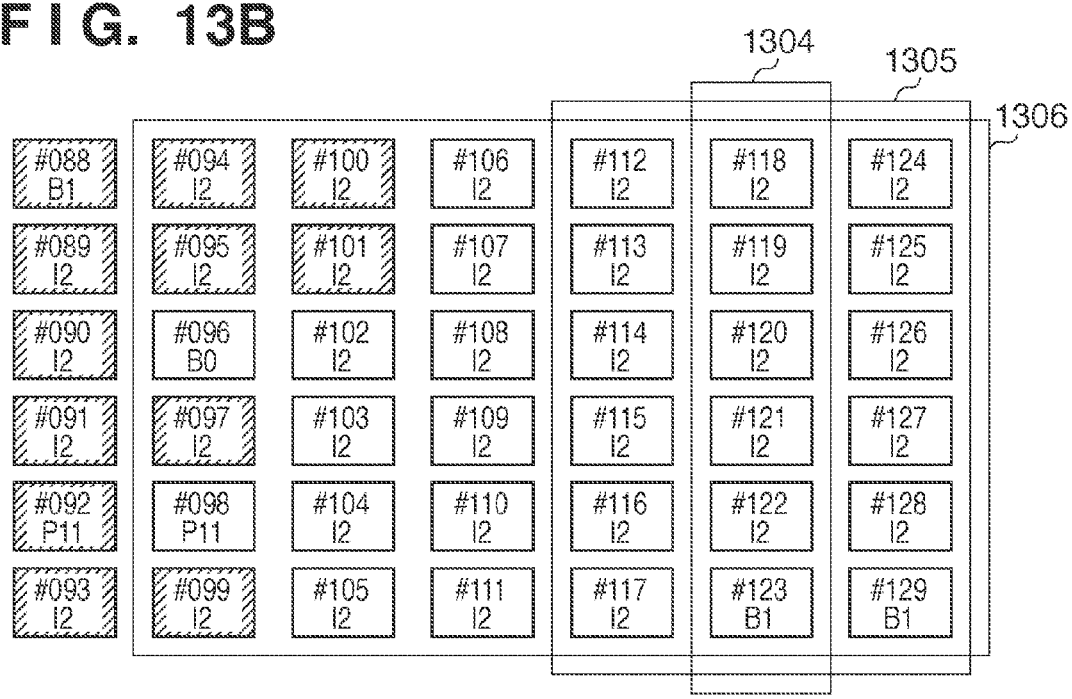

FIGS. 13A and 13B are diagrams showing representative image data stored in the memory 105 according to the third embodiment. FIGS. 13A and 13B also show the clip numbers of representative image data pieces, the coding types of frames designated as representative images in moving image data, and the positions thereof in the GOP, as with the case of FIGS. 11A to 11C. Assume that n is 6, m is 30, and the storage range L is 24.

FIG. 13A shows the same state as that in FIG. 11B. In FIG. 13A, representative image data in a box 1301 is representative image data currently displayed. Further, representative image data in a box 1302 is representative image data in the forced storage range. A box 1303 indicates the storage range L.

If the current screen is switched to the next index screen in this state, the six screens in a box 1304 in FIG. 13B are displayed as an index screen this time. At this time, data in a box 1306 serves as representative image data in the forced storage range. Then, although six screens worth of representative image data corresponding to clip numbers 124 to 129 is newly generated and is to be stored in the memory 105, 30 representative image data pieces have already been stored in the memory 105, and thus available space is insufficient. Thus, among representative image data pieces corresponding to clip numbers 088, 092, and 096 to 123 that have already been stored in the memory 105, representative image data other than that in a storage range 1306 is erased from the memory 105. In FIG. 13B, representative image data corresponding to clip numbers 088 and 092 is erased from the memory 105. In this state, two screens worth of newly generated representative image data corresponding to clip numbers 124 and 125 can be stored in the memory 105.

Then, in order to store the remaining four screens worth of representative image data corresponding to the clip numbers 126 to 129 in the memory 105, data that can be obtained in a short time among representative image data other than that in the forced storage range 1305 is detected.

In FIG. 13B, among representative image data other than that in the forced storage range 1305, representative image data corresponding to clip numbers 094 and 095 has already been deleted from the memory 105. Accordingly, data with a short necessary time among data corresponding to clip numbers 096 to 111 is deleted. Here, since data pieces corresponding to clip numbers 097 and 099 to 111 are all I pictures, the necessary time is the same. Thus, among such representative image data, the six screens that are most distant from the data in the index screen currently displayed are deleted. In FIG. 13B, four screens worth of representative image data corresponding to clip numbers 097 and 099 to 101 is furthermore deleted from the memory 105. After that, newly generated representative image data corresponding to clip numbers 126 to 129 is stored in the memory 105.

Thus, in the present embodiment, representative image data to be displayed in index screens previous and subsequent to the index screen currently displayed is set as the forced storage range, and is stored in the memory 105. Then, if representative image data is newly generated, among representative image data other than that in the forced storage range 1305, data with a short necessary time for being obtained is deleted from the memory 105, and newly generated representative image data in the forced storage range is stored in the memory 105.

Moreover, in the present embodiment, even representative image data with a long necessary time is deleted from the memory 105 if the data exceeds the determined storage range, and thereafter the newly generated representative image data is stored. Accordingly, when an index screen switching instruction has been given, it is possible to quickly display the next index screen.

Note that in the third embodiment, the storage range L can be set as appropriate based on the number of screens n of representative images to be displayed in one index screen and the number of screens m of representative image data that can be stored in the memory.

OTHER EMBODIMENTS

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-133350, filed Jun. 10, 2010, which is hereby incorporated by reference herein in its entirety.

What is claimed is:

1. A playback apparatus having a CPU, comprising:
   a playback unit that plays back moving image data of a plurality of clips from a recording medium;
   a memory;
   a generation unit that, for each clip, generates representative image data indicating a representative image of the clip based on the moving image data played back by the playback unit, and stores the generated representative image data in the memory;
   an output unit that generates an index screen using representative image data stored in the memory, and outputs the index screen to a display device; and
   a control unit that determines, based on a time necessary for the generation unit to generate each representative image data, a clip for which representative image data is to be stored in the memory, and controls the generation unit such that representative image data of the determined clip is generated and the generated representative image data is stored in the memory,
   wherein a part of the playback unit, a part of the generation unit, a part of the output unit and a part of the control unit are implemented by the CPU.

2. The playback apparatus according to claim 1, wherein the control unit deletes, from the memory, representative image data that requires the shortest time among the plurality of pieces of representative image data stored in the memory, and controls the generation unit to store the new representative image data in the memory.

3. The playback apparatus according to claim 2, wherein when a time that was necessary to generate the new representative image data is shorter than the shortest time among those of the plurality of pieces of representative image data stored in the memory, the control unit does not delete, from the memory, the representative image data that requires the shortest time and prevents the memory from storing the newly generated representative image data.

4. The playback apparatus according to claim 1, wherein among the plurality of pieces of representative image data stored in the memory, the control unit deletes, from the memory, representative image data that requires the shortest time among the plurality of pieces of representative image data of clips that exceed a predetermined range from the clips whose representative images are included in an index screen that is being displayed by the display device, and causes the memory to store representative image data newly generated by the generation unit.

5. The playback apparatus according to claim 1, wherein among the plurality of pieces of representative image data stored in the memory, the control unit deletes, from the memory, representative image data of a clip that exceeds a predetermined range from the clips whose representative images are included in an index screen that is being displayed by the display device, and causes the memory to store representative image data newly generated by the generation unit.

6. The playback apparatus according to claim 1, wherein the control unit causes the generation unit to newly generate the representative image data, in response to an instruction to display the index screen or a switching instruction to switch the index screen that is displayed by the display device.

7. The playback apparatus according to claim 1, wherein the moving image data is encoded by intra-frame coding and inter-frame predictive coding, the playback unit decodes the moving image data played back from the recording medium, and the time necessary for the generation unit to generate representative image data is the time necessary for the playback unit to decode a frame corresponding to the representative image data.

8. The playback apparatus according to claim 1, further comprising:
a unit that changes a representative image of a clip among the plurality of clips.

9. An image processing apparatus having a CPU, comprising:
an obtaining unit that obtains representative image data of a plurality of clips of moving image data and stores the obtained representative image data in a memory;
an output unit that generates an index screen using representative image data stored in the memory, and outputs the index screen to a display device; and
a control unit that determines, based on a time necessary for the obtaining unit to obtain each representative image data, a clip for which representative image data is to be stored in the memory, and controls the obtaining unit such that representative image data of the determined clip is newly obtained and the obtained representative image data is stored in the memory,
wherein a part of the obtaining unit, a part of the output unit and a part of the control unit are implemented by the CPU.

10. The image processing apparatus according to claim 9, further comprising:
an input unit that inputs moving image data of a clip corresponding to a representative image selected from a plurality of representative images included in the index screen read from a recording medium,
wherein a part of the input unit is implemented by the CPU.

11. A method of controlling a playback apparatus having a CPU, said method comprising:
playing back moving image data of a plurality of clips from a recording medium;
generating, for each clip, representative image data indicating a representative image of the clip based on the moving image data played back, and storing the generated representative image data in a memory;
generating an index screen using representative image data stored in the memory, and outputting the index screen to a display device; and
determining, based on a time necessary for the generating step to generate each representative image data, a clip for which representative image data is to be stored in the memory, and controlling said playback apparatus such that representative image data of the determined clip is generated and the generated representative image data is stored in the memory,
wherein a part of the playing back step, a part of the generating steps, and a part of the controlling step are implemented by the CPU.

12. A method of controlling an image processing apparatus having a CPU, said method comprising:
obtaining representative image data of a plurality of clips of moving image data and storing the obtained representative image data in a memory;
generating an index screen using representative image data stored in the memory, and outputting the index screen to a display device; and
determining, based on a time necessary for the obtaining unit to obtain each representative image data, a clip for which representative image data is to be stored in the memory, and controlling the image processing apparatus such that representative image data of the determined clip is newly obtained and the obtained representative image data is stored in the memory,
wherein a part of the obtaining step, a part of the generating step, and a part of the controlling step are implemented by the CPU.

13. A playback apparatus having a CPU, comprising:
a playback unit that plays back moving image data of a plurality of clips from a recording medium;
a generation unit that, for each clip, generates representative image data indicating a representative image of the clip based on the moving image data played back by the playback unit, and stores the generated representative image data in a memory that can store m screens worth of representative image data;
an output unit that generates an index screen including n screens (n <m) worth of representative images using representative image data stored in the memory, and outputs the index screen to a display device; and
a control unit that, in response to a switching instruction to switch the index screen displayed by the display device, causes the output unit to output a next index screen to the display device,
wherein the control unit determines, based on a time necessary for the generation unit to generate each representative image data, a clip for which representative image data is to be stored in the memory, and controls the generation unit such that representative image data of the determined clip is generated and the generated representative image data is stored in the memory, wherein in response to the switching instruction to switch the index screen displayed by the display device, the control unit causes the generation unit to newly generate representative image data of a predetermined clip when the representative image data of the predetermined clip is not stored in the memory, and when the newly generated representative image data cannot be stored in the memory, the control unit deletes, from the memory, representative image data that requires the longest time to be generated by the generation unit among the representative image data stored in the memory, and causes the memory to store the newly generated representative image data in the memory, wherein a part of the playback unit, a part of the generation unit, a part of the output unit and a part of the control unit are implemented by the CPU.

* * * * *